US012762349B2

(12) United States Patent
Wang et al.

(10) Patent No.: US 12,762,349 B2
(45) Date of Patent: Oct. 13, 2026

(54) CONFIGURATION METHOD AND APPARATUS OF DIALOGUE ROBOT, ELECTRONIC DEVICE, MEDIUM AND PRODUCT

(71) Applicant: Beijing Zitiao Network Technology Co., Ltd., Beijing (CN)

(72) Inventors: Daoyu Wang, Beijing (CN); Hui Sun, Beijing (CN); Ziyang Zheng, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/078,781

(22) Filed: Mar. 13, 2025

(65) Prior Publication Data

US 2025/0310283 A1 Oct. 2, 2025

Related U.S. Application Data

(63) Continuation of application No. PCT/CN2024/084845, filed on Mar. 29, 2024.

(51) Int. Cl.
*G06F 40/35* (2020.01)
*G06F 16/9032* (2019.01)
(Continued)

(52) U.S. Cl.
CPC ........ *G06F 40/35* (2020.01); *G06F 16/90332* (2019.01); *G06F 40/253* (2020.01);
(Continued)

(58) Field of Classification Search
None
See application file for complete search history.

(56) References Cited

U.S. PATENT DOCUMENTS 11,457,863 B1 * 10/2022 Roy ........................ G06F 40/35
11,735,208 B2 * 8/2023 Ramanjani ............. G10L 25/63
704/270
(Continued)

FOREIGN PATENT DOCUMENTS

CN 112948534 A 6/2021
CN 116708054 A 9/2023
(Continued)

OTHER PUBLICATIONS

M.V. Vijaya Saradhi, Swajan Reddy Gaddampally, Sai Kumar Chamarla, Arun Reddy Chiluveru, Adityan Tamarapu; Human Mimic Chatbot; Jun. 26, 2023' URL: https://wjarr.com/sites/default/files/WJARR-2023-1228.pdf (Year: 2023).*
(Continued)

*Primary Examiner* — Richa Sonifrank
(74) *Attorney, Agent, or Firm* — Alleman Hall LLP

(57) ABSTRACT

The present disclosure relates to a configuration method and an apparatus of a dialogue robot, an electronic device, a medium and a product, and relates to the technical field of artificial intelligence. The configuration method of a dialogue robot includes: creating a dialogue robot for a first user, wherein the dialogue robot is for assisting the first user in a dialogue with a second user; displaying a configuration interface of the dialogue robot of the first user; and sending a configuration instruction to the dialogue robot through the configuration interface, wherein the configuration instruction comprises a dialogue strategy.

16 Claims, 11 Drawing Sheets

(51) Int. Cl.

| | |
|---|---|
| ***G06F 40/253*** | (2020.01) |
| ***G06F 40/30*** | (2020.01) |
| ***G06N 3/006*** | (2023.01) |
| ***G06N 3/008*** | (2023.01) |
| ***G06N 20/00*** | (2019.01) |
| ***G06Q 10/40*** | (2026.01) |
| ***G10L 13/027*** | (2013.01) |
| ***G10L 15/06*** | (2013.01) |
| ***G10L 15/22*** | (2006.01) |
| ***H04L 51/02*** | (2022.01) |

(52) U.S. Cl.

CPC ............. *G06F 40/30* (2020.01); *G06N 3/006* (2013.01); *G06N 3/008* (2013.01); *G06N 20/00* (2019.01); *G06Q 10/40* (2026.01); *G10L 13/027* (2013.01); *G10L 15/22* (2013.01); *H04L 51/02* (2013.01); *G10L 15/063* (2013.01); *G10L 2015/228* (2013.01)

(56) References Cited

U.S. PATENT DOCUMENTS

| | | | | |
|---|---|---|---|---|
| 2001/0033298 | A1 | 10/2001 | Slotznick | |
| 2018/0107461 | A1* | 4/2018 | Balasubramanian | G06F 8/38 |
| 2018/0293483 | A1* | 10/2018 | Abramson | H04L 51/02 |
| 2019/0121842 | A1* | 4/2019 | Catalano | G06F 40/247 |
| 2020/0357403 | A1* | 11/2020 | Chen | G06F 16/3329 |
| 2021/0173718 | A1* | 6/2021 | Patel | G06F 40/295 |
| 2021/0390144 | A1* | 12/2021 | B M S | G06F 16/635 |
| 2024/0195758 | A1* | 6/2024 | Sharifi | G06F 21/32 |
| 2024/0283868 | A1* | 8/2024 | Ferris | G06F 40/211 |
| 2024/0412001 | A1* | 12/2024 | Agarwal | G06F 40/253 |
| 2025/0258587 | A1* | 8/2025 | Gervais | G06F 3/0484 |
| 2025/0307565 | A1* | 10/2025 | Wang | G06F 40/35 |
| 2025/0330436 | A1* | 10/2025 | Xia | H04L 51/02 |
| 2025/0337706 | A1* | 10/2025 | Xia | H04L 51/02 |

FOREIGN PATENT DOCUMENTS

| | | | |
|---|---|---|---|
| CN | 116741143 | A | 9/2023 |
| CN | 117112746 | A | 11/2023 |
| CN | 117668193 | A | 3/2024 |

OTHER PUBLICATIONS

ISA China National Intellectual Property Administration, International Search Report Issued in Application No. PCT/CN2024/084845, Nov. 22, 2024, 6 pages.

ISA China National Intellectual Property Administration, Written Opinion of the International Searching Authority Issued in Application No. PCT/CN2024/084845, Nov. 22, 2024, 8 pages.

European Patent Office, Office Action Issued in Application No. 24863841.3, Aug. 7, 2025, Germany, 10 pages.

Mao, M. et al., "Multi-User Chat Assistant (MUCA): a Framework Using LLMs to Facilitate Group Conversations," arXiv, Available Online at https://arxiv.org/abs/2401.04883 Jan. 10, 2024, 29 pages.

Wang, J et al., "Impact of Personalised AI Chat Assistant on Mediated Human-Human Textual Conversations: Exploring Female-Male Differences," Proceedings of "IUI '24 Companion: Companion Proceedings of the 29th International Conference on Intelligent User Interfaces" (name of conference), Mar. 18, 2024, Greenville, South Carolina, 10 pages.

* cited by examiner

CONFIGURATION METHOD AND APPARATUS OF DIALOGUE ROBOT, ELECTRONIC DEVICE, MEDIUM AND PRODUCT

CROSS-REFERENCE TO RELATED APPLICATIONS

The present disclosure is a continuation application, under 35 U.S.C. § 111(a), of International Patent Application No. PCT/CN2024/084845, filed on Mar. 29, 2024, the disclosure of which is hereby incorporated into this disclosure by reference in its entirety.

TECHNICAL FIELD

The present disclosure relates to the technical field of artificial intelligence, in particular to a configuration method and an apparatus of a dialogue robot, an electronic device, a medium and a product.

BACKGROUND

With the development of artificial intelligence and machine learning technology, an intelligent dialogue robot can be realized by using a machine learning model. For example, the intelligent dialogue robot can be used as intelligent customer service or virtual friends to receive consultation sent from users and feed back the answers to users.

SUMMARY

This Summary section is provided to introduce concepts in a brief form, which will be described in detail in the Detailed Description later. This Summary section is not intended to identify key features or essential features of the claimed technical solution, nor is it intended to limit the scope of the claimed technical solution.

According to some embodiments of the present disclosure, there is provided a configuration method of a dialogue robot, comprising: creating a dialogue robot for a first user, wherein the dialogue robot is for assisting the first user in a dialogue with a second user; displaying a configuration interface of the dialogue robot of the first user; and sending a configuration instruction to the dialogue robot through the configuration interface, wherein the configuration instruction comprises a dialogue strategy.

According to some embodiments of the present disclosure, there is provided a configuration apparatus of a dialogue robot, comprising: a creation module configured for creating a dialogue robot for a first user, wherein the dialogue robot is for assisting the first user in a dialogue with a second user; a display module configured for displaying a configuration interface of the dialogue robot of the first user; and a sending module configured for sending a configuration instruction to the dialogue robot through the configuration interface, wherein the configuration instruction comprises a dialogue strategy.

According to some embodiments of the present disclosure, there is provided an electronic device, comprising: a memory; and a processor coupled to the memory, the processor being configured to perform the configuration method of a dialogue robot of any embodiment of the present disclosure based on instructions stored in the memory.

According to some embodiments of the present disclosure, there is provided a non-transitory computer-readable storage medium, on which a computer program is stored, which, when executed by a processor, performs the configuration method of a dialogue robot of any embodiment of the present disclosure.

According to some embodiments of the present disclosure, there is provided a non-transitory computer program product, which, when run on a computer, causes the computer to implement the configuration method of a dialogue robot of any embodiment of the present disclosure.

According to some embodiments of the present disclosure, there is provided a computer program, comprising: instructions that, when executed by a processor, cause the processor to perform the configuration method of a dialogue robot of any embodiment of the present disclosure.

Other features, aspects and advantages of the present disclosure will become clear from the following detailed description of exemplary embodiments of the present disclosure with reference to the following accompanying drawings.

BRIEF DESCRIPTION OF THE DRAWINGS

Preferred embodiments of the present disclosure will be described below with reference to the accompanying drawings. The accompanying drawings, which are included in and form a part of this specification together with the detailed description below, are provided to provide a further understanding of the present disclosure, and serve to explain the present disclosure. It should be understood that the accompanying drawings in the following description only relate to some embodiments of the present disclosure, and do not constitute a limitation of the present disclosure. In the accompanying drawings.

Figure 1:
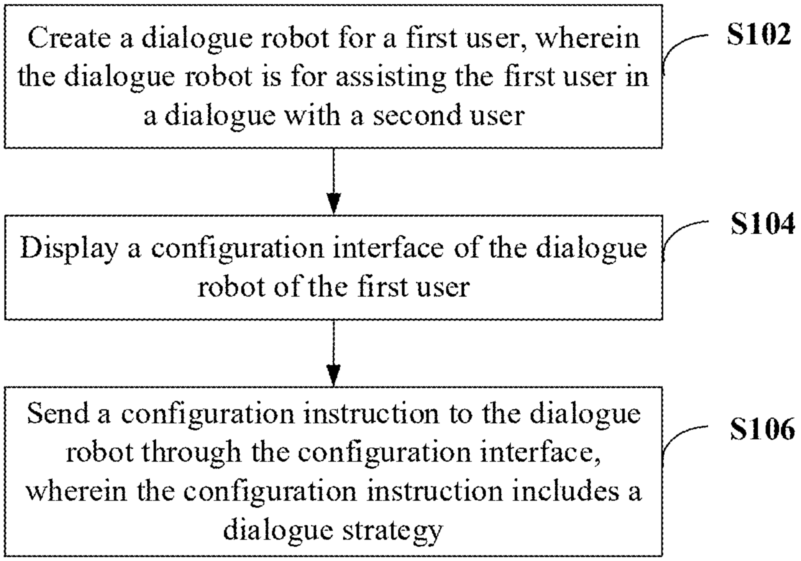
FIG. 1 shows a flow schematic diagram of a configuration method of a dialogue robot according to some embodiments of the present disclosure.

It should be understood that for the convenience of description, the dimensions of various parts shown in the drawings are not necessarily drawn according to the actual proportional relationship. The same or similar reference numerals are used throughout the drawings to indicate the same or similar parts. Therefore, once an item is defined in one drawing, it may not be discussed further in subsequent drawings.

DETAILED DESCRIPTION

The technical solutions in the embodiments of the present disclosure will be clearly and completely described below with reference to the accompanying drawings in the embodiments of the present disclosure, but obviously, the described embodiments are only a part of the embodiments of the present disclosure instead of all of them. The following description of the embodiments is merely illustrative in nature and shall not set any limitation on the present disclosure and its application or utilization. It should be understood that the present disclosure can be embodied in various forms and should not be construed as limited to the embodiments set forth herein.

It should be understood that the various steps recited in the method embodiments of the present disclosure may be performed in a different order, and/or performed in parallel. Moreover, the method embodiments may include additional steps and/or omit performing the illustrated steps. The scope of the present disclosure is not limited in this respect. Unless otherwise specified, the relative arrangement, mathematic expressions and values of the components and steps set forth in these embodiments should be interpreted as merely exemplary and not limiting the scope of the present disclosure.

The term "include" and its variants used in the present disclosure means an open term including at least the following elements/features, but not excluding other elements/features, that is, "include but not limited to". Therefore, "include" and "contain" have the same meaning. The term "based on" means "based at least in part on".

References throughout this specification to "an embodiment", "some embodiments" or "embodiments" means that a particular feature, structure or characteristic described in connection with an embodiment is included in at least one embodiment of the present invention. For example, the term "an embodiment" means "at least one embodiment"; the term "another embodiment" means "at least one other embodiment"; and the term "some embodiments" means "at least some embodiments". Moreover, the appearances of the phrases "in an embodiment", "in some embodiments" or "in embodiments" in various places throughout the specification do not necessarily all refer to the same embodiment, but they may also refer to the same embodiment.

It should be noted that the terms "first", "second", and the like in the present disclosure are only used for distinguishing different devices, modules or units, and are not used for limiting the order of functions performed by the devices, modules or units or interdependence thereof. Unless otherwise specified, the concepts of "first" and "second" are not intended to imply that the objects so described must be in a given order in time, space, ranking or in any other way.

It should be noted that references to "a" or "a plurality of" mentioned in the present disclosure are intended to be illustrative rather than limiting, and those skilled in the art will appreciate that unless otherwise clearly indicated in the context, they should be understood as "one or more".

The names of messages or information exchanged between devices in the embodiments of the present disclosure are for illustrative purposes only, and are not intended to limit the scope of the messages or information.

Embodiments of the present disclosure will be described in detail with reference to the accompanying drawings, but the present disclosure is not limited to these specific embodiments. The following specific embodiments can be combined with each other, and the same or similar concepts or processes may not be repeated in some embodiments. Furthermore, in one or more embodiments, specific features, structures, or characteristics may be combined in any suitable manner that will be apparent to those of ordinary skill in the art from the present disclosure.

It should be understood that the present disclosure does not limit how to obtain an image to be applied/processed. In an embodiment of the present disclosure, it can be obtained from a storage device, such as an internal memory or an external storage device, and in another embodiment of the present disclosure, a camera assembly can be called to shoot. It should be noted that the acquired image can be a captured image or a frame image in a captured video, and it is not particularly limited to this.

In the context of the present disclosure, the image may refer to any of a variety of images, such as a color image, a grayscale image, and the like. It should be noted that in the context of this specification, the type of the image is not particularly limited. In addition, the image can be any suitable image, such as an original image obtained by a camera device, or an image that has been subjected to specific processing of the original image, such as preliminary filtering, antialiasing, color adjustment, contrast adjustment, normalization, and the like. It should be pointed out that the pretreatment operation may also include other types of pretreatment operations known in the art, and will not be described in detail here.

In the scenario of the use of an intelligent dialogue robot in the related technology, the robot is mainly provided by the developer of the application, and is used as a party to dialogue with the user, that is, the responder of the message sent from the user. The robot can respond to messages sent from the user according to the user's input and its own knowledge base.

In the related technology, the robot can only perform the dialogue according to the fixed configuration provided by the application side, and cannot be applied to the personalized network social scenario of each user. The embodiments of the present disclosure provide a configuration method of a robot, such that the configured robot can assist a user to have a dialogue with other users.

FIG. 1 shows a flow schematic diagram of a configuration method of a dialogue robot according to some embodiments of the present disclosure. As shown in FIG. 1, this embodiment includes steps S102 to S106.

In step S102, a dialogue robot is created for a first user, wherein the dialogue robot is for assisting the first user in a dialogue with a second user.

This embodiment describes the process of creating a dialogue robot for the first user to provide assistance in a dialogue scene between the first user and other users. Other users can be any user except the first user, or other designated users except the first user. For the convenience of description, the embodiments of the present disclosure take the second user to refer to the user who has a dialogue with the first user. The second user can be any one in one or more user sets. It should be noted that the dialogue between the first user and the second user may include messages sent from both the first user and the second user at the same time, or may only include message(s) sent from the second user because the first user does not check and reply to message(s) in time, or only include message(s) sent from the first user.

The first user can be understood as a user of a current application, so this embodiment can also be understood as a process of specifically configuring the information under an account of the first user.

The dialogue robot refers to a robot that can chat and talk with other subjects, which can be real people or other dialogue robot(s). The dialogue robot can generate corresponding response content based on the messages output by other subjects in the dialogue scene. The robot in the embodiments of the present disclosure refers to an agent (intelligence agent) that can generate a response to input information, which can be implemented in software, hardware or a combination of software and hardware. Robots can also be called digital people or virtual agents of machine learning models. Robots can be realized based on machine learning models, such as a Large Language Model (LLM) or a Foundation Model. The machine learning model can be a generative model, which is used to output the target content based on the input information. The input information of the generative model includes the processing basis of the generative model in the generation process, such as what information to refer to perform the generation process, the requirements of the output target content, and so on. A generative model includes, for example, a model to generate based on a text or a model to generate based on an image. The output of the generative model may include a text, an image or a combination of the two. Of course, the input or output of the generative model can also be other modal data, such as audio, video or a combination of multiple types of data. The generative model can be a single modality model, such as a model that generates text based on text (referred to as "text-to-text model") and a model that generates images based on images (referred to as "image-to-image model"); alternatively, the generative model can also be a cross-modality model, that is, a model whose input and output belong to different modes, such as a model that generates images based on text (referred to as "text-to-image model"); alternatively, the input of the generative model can include multiple modalities, and the output can also include multiple modalities.

Creating a dialogue robot refers to generating a dialogue robot based on some basic information. The basic information includes, for example, name, head portrait, voice, etc., and can further include the personality, gender, age, etc. of the robot. The basic information can be input by users or generated randomly. The dialogue robot can be created automatically, for example, in response to the generation of the account of the first user with the authorization of the first user; or it can also be started in response to the trigger operation of the first user on the creation process during the use of the application by the first user.

After creating the dialogue robot, the dialogue robot can be directly used to assist the dialogue of the first user, or the dialogue robot can be allowed to assist the dialogue only after a dialogue-related configuration is performed on the dialogue robot. In the former case, a default general configuration performed by the dialogue robot can be used.

Assisting the first user in the dialogue with the second user refers to taking a place of the first user to have a dialogue with other users (such as the second user), or participating in the dialogue between the first user and other users. That is, in the dialogue scene between the first user and the second user, the dialogue robot can directly take the place of the first user, for example, as a "virtual avatar" of the first user (such as AI avatar), and the dialogue robot has a dialogue with the second user; alternatively, in the dialogue scene between the first user and the second user, the dialogue robot can directly participate in the dialogue between the first user and the second user, and the result is similar to the "group chat" of the first user, the dialogue robot and the second user, so that the communication with the first user and the second user is more smooth or the interest and richness of the dialogue between the first user and the second user are improved.

In step S104, a configuration interface of the dialogue robot of the first user is displayed.

This configuration interface is used to configure a dialogue strategy. The dialogue strategy refers to what way the robot should adopt to have a dialogue with the second user under what scene, so that the robot can produce a more reasonable, more effective or vivid reply to the specific dialogue scene. The first user can configure one or more dialogue strategies. For example, multiple dialogue strategies can be configured through one configuration process, or through multiple configuration processes.

The configuration interface is used to receive the specific content of the dialogue strategy input by the first user, the feedback information of the existing dialogue strategy, the reference dialogue that can be used to extract the dialogue strategy or other forms of content, which is not limited by the embodiments of the present disclosure.

In step S106, a configuration instruction is sent to the dialogue robot through the configuration interface, wherein the configuration instruction includes a dialogue strategy.

In some embodiments, a dialogue strategy is generated based on information received through the configuration interface, and a configuration instruction is further generated based on the dialogue strategy.

The configuration instruction may also include instruction information, such as for instructing the dialogue robot to save the dialogue strategy or information determined based on the dialogue strategy, and to call the dialogue strategy in the dialogue scene of the first user. After receiving the input information through the configuration interface, the robot can be instructed to perform corresponding configuration operations according to the received information, such as storing the dialogue strategy, or adjusting the processing logic of the robot based on the dialogue strategy, or fine-tuning the machine learning model on which the robot relies.

After the configuration is completed, the dialogue robot can perform corresponding dialogue-related operations according to the dialogue strategy in the dialogue scene of the first user, such as participating in the dialogue or sending dialogue messages in a specific form or content.

It should be noted that the first user can create one or more dialogue robots, and for each robot, the process of creation and configuration of dialogue strategies can be performed by using the embodiments of the present disclosure.

The above embodiment can use a dialogue robot to assist the first user in the dialogue process between the first user and other users. In order to realize the auxiliary function of the dialogue robot, the above embodiment provides a configuration interface of the dialogue strategy to instruct the robot to configure the dialogue strategy. Therefore, the dialogue robot can provide more accurate and effective responses in various dialogue scenes of the first user, which improves the dialogue effect of assisting the first user and the second user to have a dialogue.

In some embodiments, the configuration instruction includes a dialogue strategy for a specified dialogue scene. The dialogue scene includes at least one of a dialogue between the first user and the second user comprising a specified dialogue topic, the second user belonging to a specified category, the second user being a specified user, or a dialogue state of the first user belonging to a specified state. The dialogue strategy includes at least one of a strategy of whether the dialogue robot participating in the dialogue between the first user and the second user or a language style of the dialogue robot.

The dialogue topic included in the dialogue between the first user and the second user can be determined by keywords included in the dialogue or semantic key information extracted after semantic processing is performed on the dialogue. That is, an exemplary scene may be that a specific dialogue strategy is used in response to the first user and the second user talking about specified content.

The category of the second user can be specified by the first user in advance, such as "family", "friends", "college classmates", etc., or it can be automatically determined according to the basic information of the second user. That is, an exemplary scene may be that a specific dialogue strategy is used in response to the first user talking to a specific user. The specific user can be a user of a specific category or a user designated by the first user.

The dialogue state of the first user is used to indicate the current participation degree of the first user and whether the first user can reply to the messages sent from the second user in time. In some embodiments, the dialogue state of the first user can be determined according to the first user's frequency of sending messages or the time length the first user takes to reply messages. For example, in the dialogue between the first user and the second user, the last message comes from the second user, and if the time length between the sending of the last message and the current time exceeds a threshold, the first user is considered to be in the designated state of "busy". For another example, when the first user can reply to most messages from the second user in time, the first user is considered to be in the designated state of "online". Of course, the above states are only schematic, and those skilled in the art can set various dialogue states and their names as needed.

The dialogue strategy includes a strategy of whether the dialogue robot participates in the dialogue between the first user and the second user, that is, a strategy that the dialogue robot automatically "appears". Based on the configuration instruction, the dialogue robot can be instructed to automatically appear in what scene and assist the first user to carry out the dialogue.

The dialogue strategy includes a language style of the dialogue robot, that is, what language style the robot uses to assist the first user in dialogue. The language style includes, for example, tone, mantra, regional style and so on. Based on the configuration instruction, the dialogue robot can be instructed to use the dialogue strategy corresponding to one or more dialogue scenes.

For the same dialogue scene, multiple strategies of different dimensions can be configured; for the same dialogue strategy, multiple dialogue scenes can also be set, that is, the same dialogue strategy can be used in multiple dialogue scenes. The following is an exemplary description of the combination of several dialogue scenes and dialogue strategies.

In some embodiments, a first dialogue scene comprises at least one of the dialogue between the first user and the second user comprising the specified dialogue topic, the second user belonging to the specified category, the second user being the specified user, or the dialogue state of the first user belonging to the specified state. The dialogue strategy for the specified dialogue scene comprises: participating in the dialogue between the first user and the second user in response to detecting the first dialogue scene.

For example, in a dialogue scene between the first user and the second user, in response to a message sent from the first user or a message sent from the second user including a specified topic, or in response to the messages sent from the first user and the second user together including a specified topic, the dialogue robot is automatically called to participate in the dialogue between the first user and the second user. Therefore, for a specified topic, the dialogue robot can provide more information about the topic for the dialogue between the first user and the second user. For example, when the first user and the second user are talking about a scenic spot, the dialogue robot can participate in the dialogue and provide some travel strategies; for another example, when the first user and the second user are talking about a movie, the dialogue robot can provide relevant information about the movie.

For another example, in a dialogue scene between the first user and the second user, in response to the second user belonging to a specified category or being a specified user, the dialogue robot is automatically called to participate in the dialogue between the first user and the second user. The dialogue robot can be called when the first user sends a message to the second user for the first time, or when the time length between the last dialogue between the first user and the second user and the current time exceeds a specified threshold, and the first user initiates a dialogue with the second user again, the dialogue robot can be automatically called. For example, when the first user is not good at words, but the second user is very important to the first user, when talking with the second user, the dialogue atmosphere between the first user and the second user can be activated by calling the dialogue robot.

For still another example, in the dialogue scene between the first user and the second user, a dialogue robot is automatically called to participate in the dialogue between the first user and the second user in response to the first user being in a specified state. For example, in response to that in the dialogue between the first user and the second user, the last message coming from the second user, and the time length between the sending of the last message and the current time exceeds the threshold, it means that the first user has not replied to the second user for a long time. At this time, by calling the dialogue robot to participate in the dialogue, the dialogue robot can take the place of the first user to reply to the second user, so as to help the user in time when the first user is busy.

In some embodiments, a second dialogue scene includes at least one of the second user belonging to the specified category or the second user being the specified user, and the dialogue strategy for the specified dialogue scene comprises: determining, in response to detecting the second dialogue scene, a language style based on an identification or a category of the second user having the dialogue with the first user. Therefore, when the dialogue robot participates in the dialogue between the first user and the second user, it can send messages by using the language style.

For example, for a good friend of the first user, the message sent from the dialogue robot can use light and humorous language; or for a boss of the first user, the message sent from the dialogue robot should avoid using teasing language and so on. Therefore, for different users, the dialogue robot can use different language styles to participate in the dialogue, which improves the flexibility of the dialogue of the dialogue robot.

In some embodiments, a third dialogue scene comprises a topic of the dialogue belonging to a specified category, and the dialogue strategy for the specified dialogue scene comprises: determining, in response to detecting the third dialogue scene, a language style based on the topic of the dialogue between the first user and the second user, and participating in the dialogue based on the language style. For example, for topics of life, light and humorous language can be used; or for topics of science, a rigorous language can be used. Therefore, the language style of the dialogue of the dialogue robot can be richer.

Figure 2A:
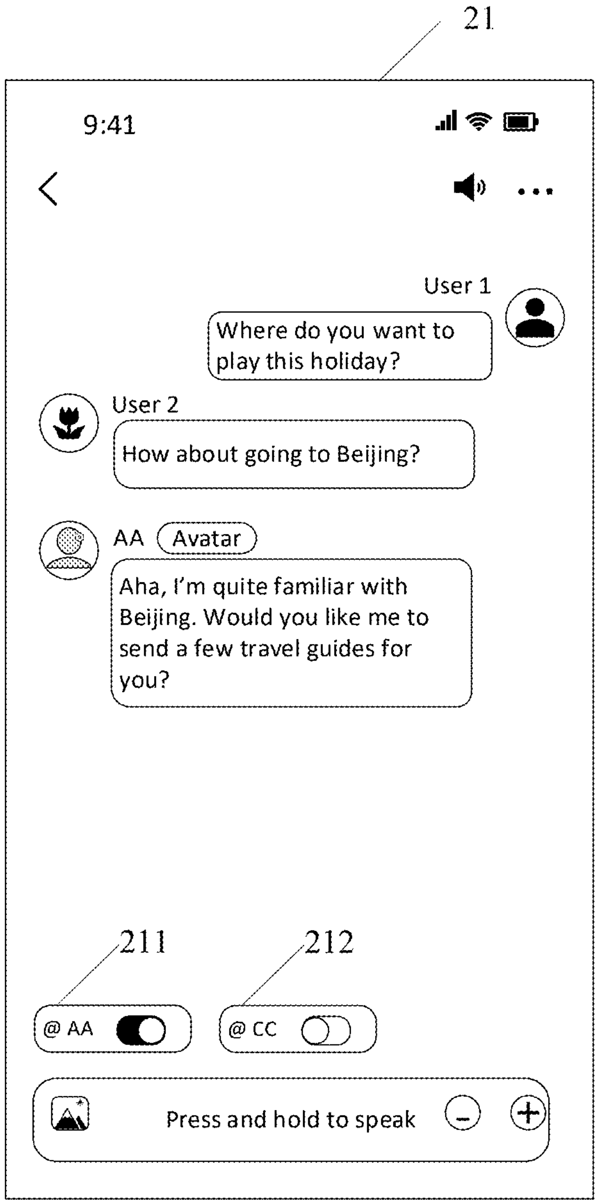
FIG. 2A shows a schematic diagram of a dialogue interface between a first user and a second user according to some embodiments of the present disclosure.

FIG. 2A shows a schematic diagram of a dialogue interface between a first user and a second user after configuring the dialogue robot. As shown in FIG. 2A, a dialogue interface 21 of this embodiment includes a dialogue between a user 1 and a user 2, and the users are talking about the topic of where to play in the holiday.

In some embodiments, it can be determined that the topic of the dialogue is a trip to Beijing by analyzing the dialogue content, and the dialogue robot AA of the user 1 can participate in the dialogue at this time. In some embodiments, by determining that the user 2 who is talking to the user 1 is a good friend of the user 1, the dialogue robot AA can be called to appear in the dialogue between them and reply in a relaxed tone. In the dialogue interface 21, a control 221 can be used to indicate that the dialogue robot AA is in a state of participating in the dialogue, and a control 222 can be used to indicate that a dialogue robot CC is in a state of not participating in the dialogue. The user 1 can also manually control whether these dialogue robots participate in the dialogue by triggering these controls.

Figure 2B:
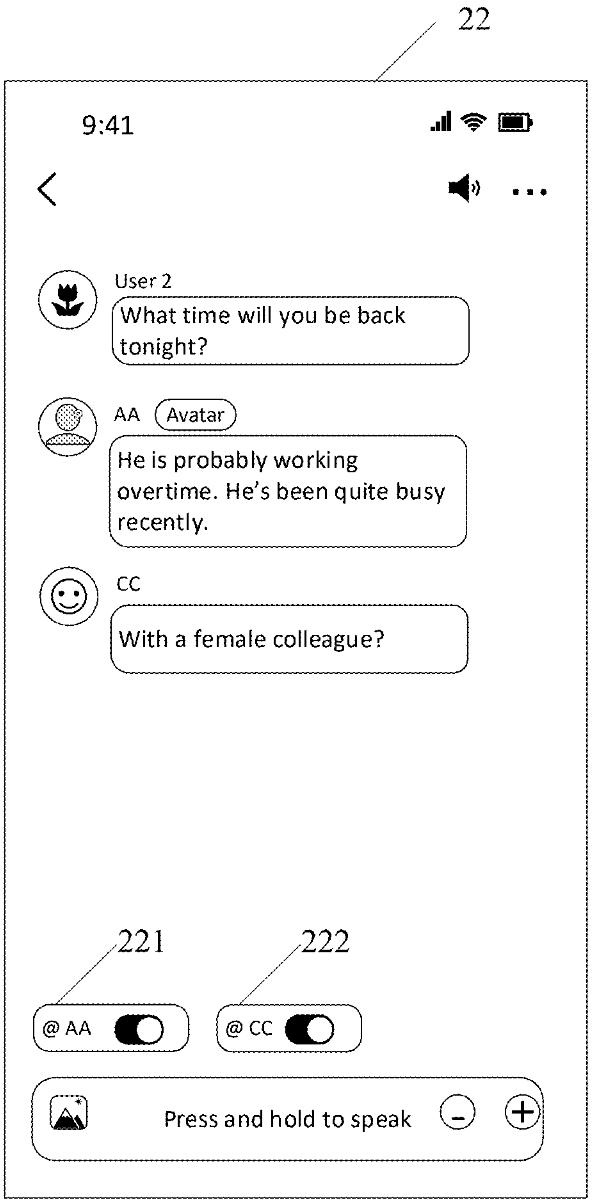
FIG. 2B shows a schematic diagram of a dialogue interface between a first user and a second user according to other embodiments of the present disclosure.

FIG. 2B shows a schematic diagram of a dialogue interface between a first user and a second user according to other embodiments of the present disclosure. As shown in FIG. 2B, a dialogue interface 22 of this embodiment is a dialogue interface between the user 1 and the user 2, and the user 2 sends a message, but does not get a reply from the user 1 after a period of time. By determining that the user 1 is in a "busy" state, the digital avatar (that is, dialogue robot) AA of the user 1 is automatically called and replies. According to the setting information, another dialogue robot CC is also automatically called according to the dialogue scene, and replies with a relaxed tone using a specified dialogue strategy. In the dialogue interface 22, controls 221 and 222 can be used to respectively indicate that two dialogue robots are in a state of participating in the dialogue.

The above is an exemplary description of the content of the configuration instruction. The following is an exemplary description of several implementations of the creation and configuration interface of the dialogue robot.

Figure 3A:
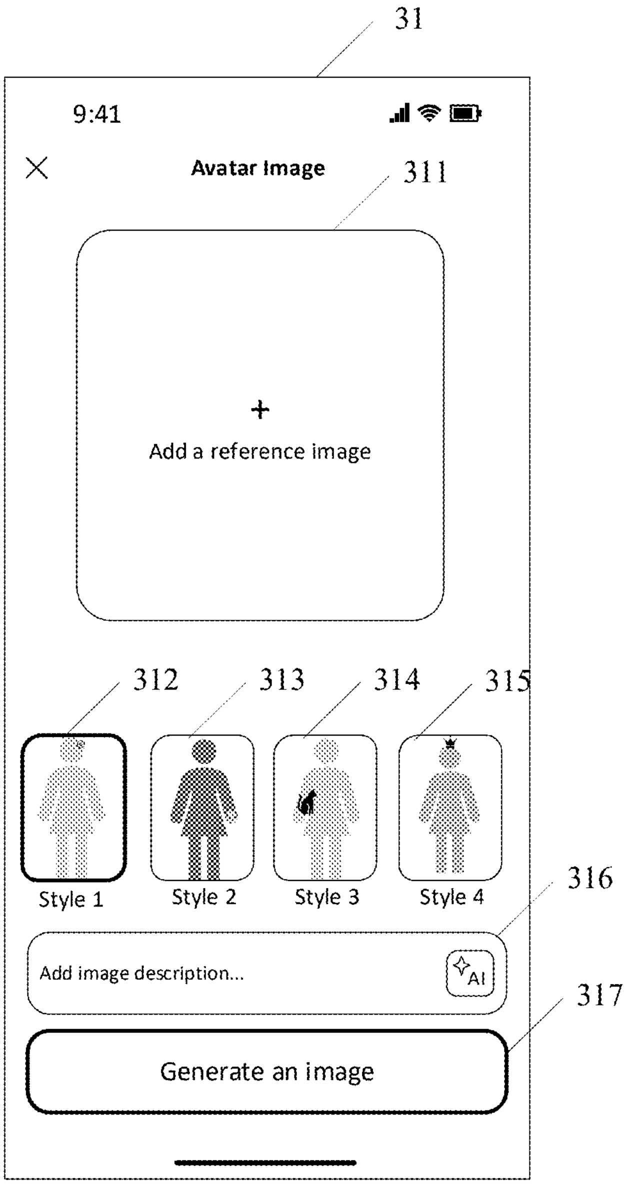
FIG. 3A shows a schematic diagram of a creation interface of a dialogue robot according to some embodiments of the present disclosure.

FIG. 3A exemplarily shows a schematic diagram of a creation interface of a dialogue robot according to some embodiments of the present disclosure. As shown in FIG. 3A, a creation interface 31 of this embodiment is an image creation interface, and includes an image adding control 311 for the first user to upload an image. The upload control 311 can be used to read a local gallery or a network gallery with the authorization of the first user, or to call a camera of a terminal of the first user to take a photo with the authorization of the first user.

The creation interface 31 may also include one or more image style controls 312 to 315, so as to generate an image of the robot (e.g., head portrait, portrait, full-length portrait) based on the image(s) added by the user and the image style(s) selected by the user.

In some embodiments, the user can also input the description information of the image style, so as to process the added image more flexibly. For example, an image of the dialogue robot can be generated based on the style description information input by the first user and an image from the first user authorized by the first user; and the dialogue robot is created for the first user based on the image of the dialogue robot. For example, the creation interface 31 may include an input control 316 for accepting the style description information input by the first user. After the user confirms the input content, the image added by the first user and the style description information can be input into a generative model for generating images, so that the image added by the first user can be processed based on the style description information to generate an image with a corresponding style as the image of the dialogue robot.

The creation interface 31 may further include a generation control 317 to preview the generated image of the dialogue robot. According to the preview result, the first user can determine whether it is necessary to regenerate the image of the dialogue robot.

In some embodiments, voice information of the dialogue robot is generated based on voice of the first user authorized by the first user; and the dialogue robot is created for the first user based on the voice information of the dialogue robot. Therefore, the created dialogue robot can imitate the voice of the first user, and when the message sent from the dialogue robot is played in an audio way, the dialogue robot can speak in a voice similar to that of the first user, which strengthens the attribute of the dialogue robot as a digital avatar of the first user.

Figure 3B:
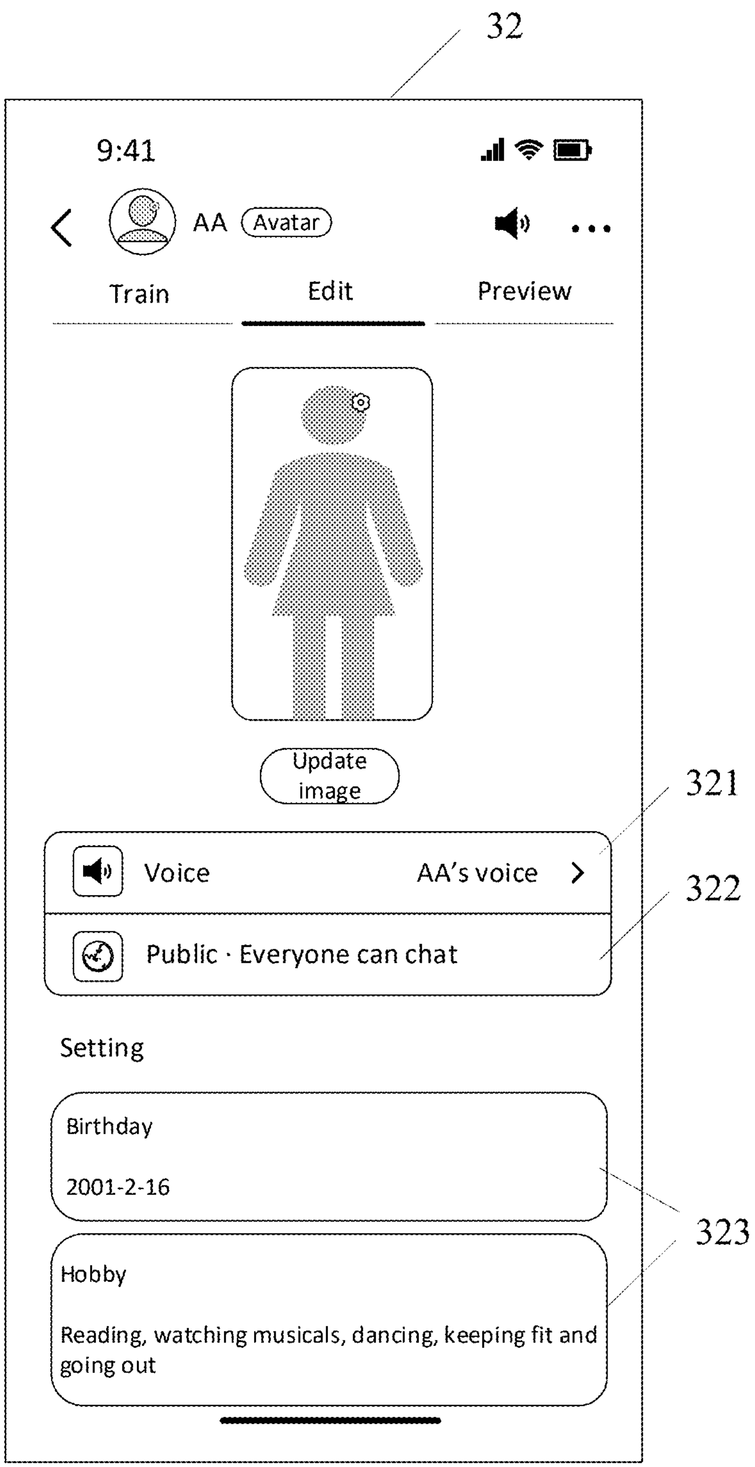
FIG. 3B exemplarily shows a schematic diagram of a setting interface of a dialogue robot according to some embodiments of the present disclosure.

FIG. 3B exemplarily shows a schematic diagram of a setting interface of a dialogue robot according to some embodiments of the present disclosure. As shown in FIG. 3B, a setting interface 32 is used for setting the digital avatar robot AA created by the first user and displaying the set information, wherein a voice setting control 321 is included, through which the first user can upload his own voice or select other voices provided by the application. For example, a reading sample of the user can be displayed, and the voice when the user speaks the reading sample can be collected under the authorization of the user, from which the voiceprint information can be extracted as the voiceprint information of the dialogue robot.

The setting interface 32 may also include a permission setting control 322 to set the dialogue scenes with which users the dialogue robot is used.

The setting interface 32 may also include a setting information display control 323, which illustratively includes the hobby and birthday of the dialogue robot in this embodiment. They can be directly input or modified by the user in the setting information display control 323, or can be automatically generated according to the dialogue content between the first user and the dialogue robot, so that the convenience of setting the dialogue robot can be improved.

Figure 3C:
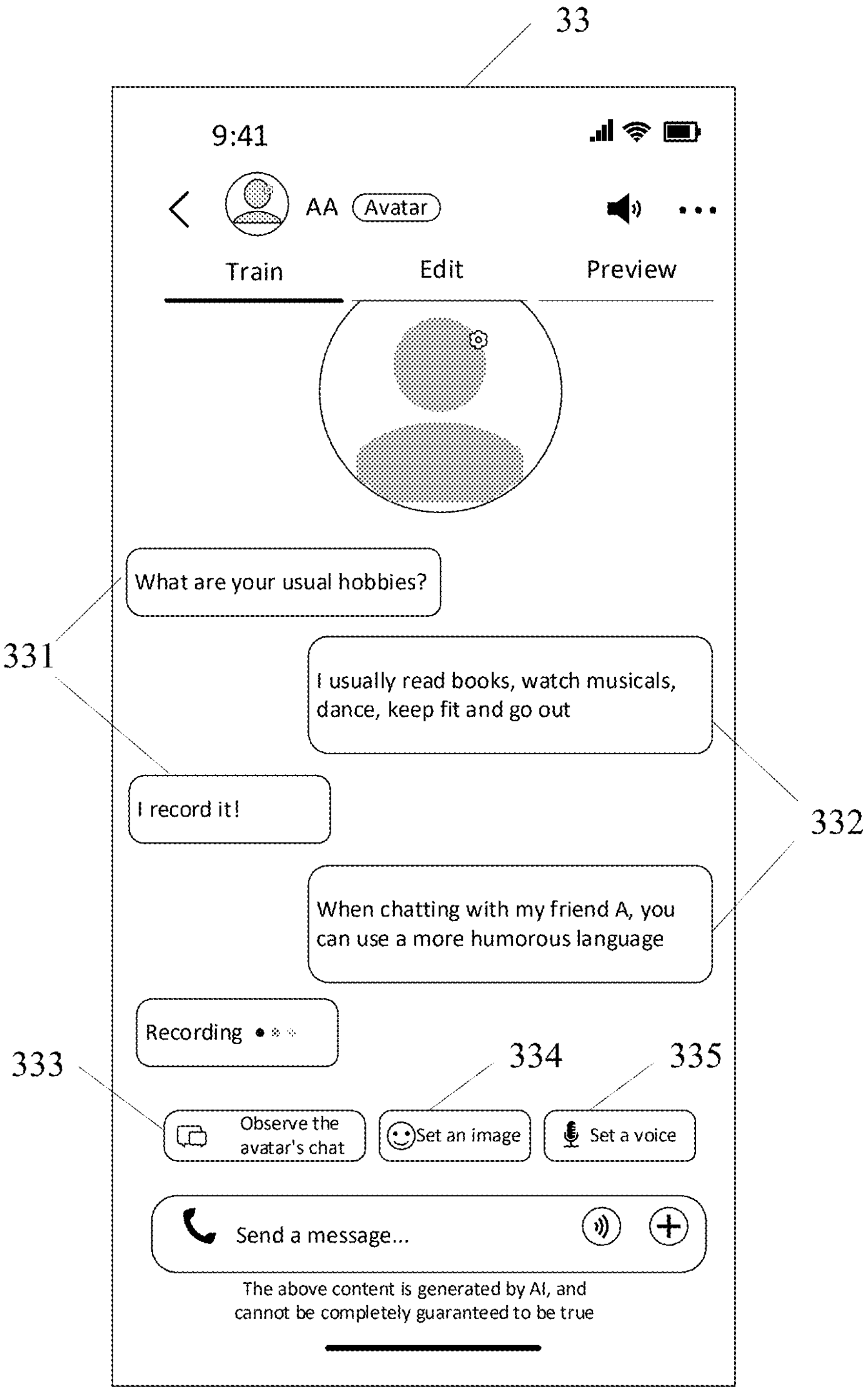
FIG. 3C shows a schematic diagram of a dialogue interface between a first user and a dialogue robot according to some embodiments of the present disclosure.

FIG. 3C shows a schematic diagram of a dialogue interface between a first user and a dialogue robot according to some embodiments of the present disclosure. As shown in FIG. 3C, an interface 33 is a dialogue interface between the first user and the dialogue robot AA of the first user. In the dialogue interface of this embodiment, messages 331 on the left are sent from the dialogue robot, and messages 332 on the right are sent from the first user.

In this embodiment, the dialogue robot AA actively asks the user "What are your usual hobbies?" to guide the user to send setting information. The first user sends "I usually read books, watch musicals, dance, keep fit and go out", so that the dialogue robot AA as the digital avatar of the first user can take this information as its own setting information, so as to assist the first user in dialogue based on this setting information.

Figure 3D:
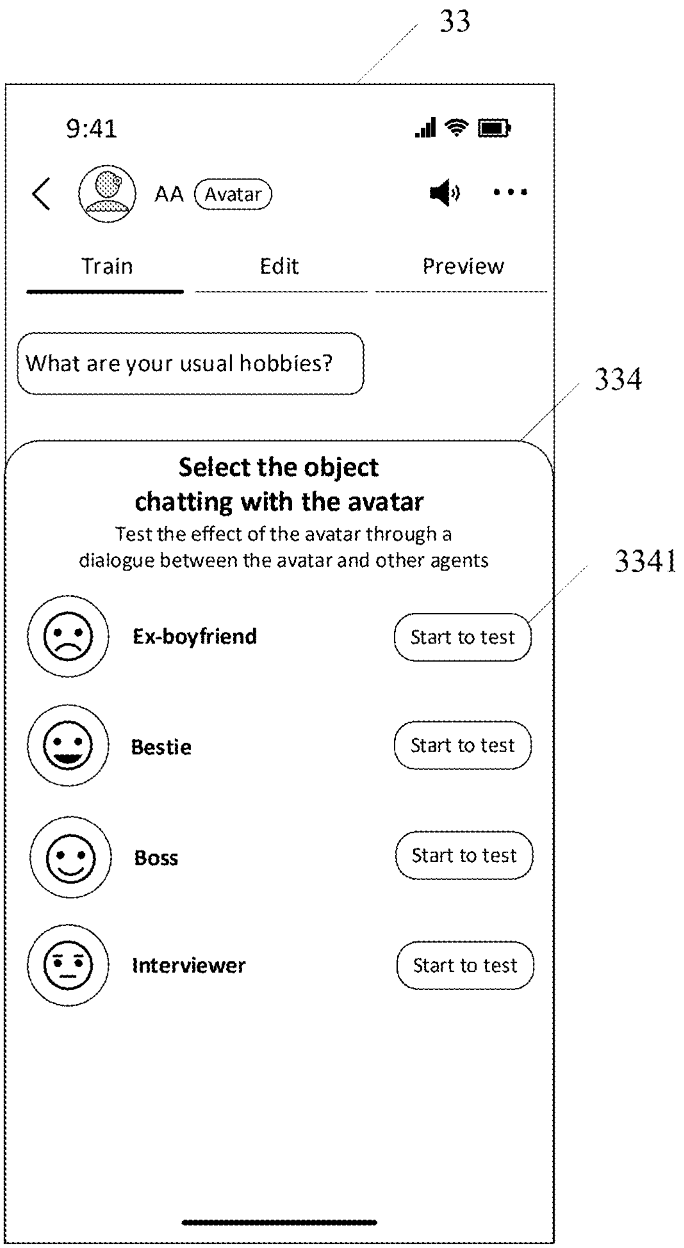
FIG. 3D shows a schematic diagram of a interface for agents selection according to some embodiments of the present disclosure.

The dialogue interface 33 may further include a test control 333. The avatar test control 333 can trigger the dialogue robot AA to chat with other agents (i.e., dialogue robots) to provide the user with a reference to whether the current dialogue strategy of the dialogue robot AA is ideal or not. Other agents may also be created by the first user, or may come from other users and be publicly released or shared with the first user, or they may be default agents provided by the application. In response to the user triggering the test control 333, an agent selection interface 334 as shown in FIG. 3D can be displayed, and the agent selection interface 334 includes one or more agents and confirmation controls corresponding to the agents. For example, when the first user selects to test the dialogue scene between the dialogue robot AA and the "ex-boyfriend", a control 3341 can be triggered.

Figure 3E:
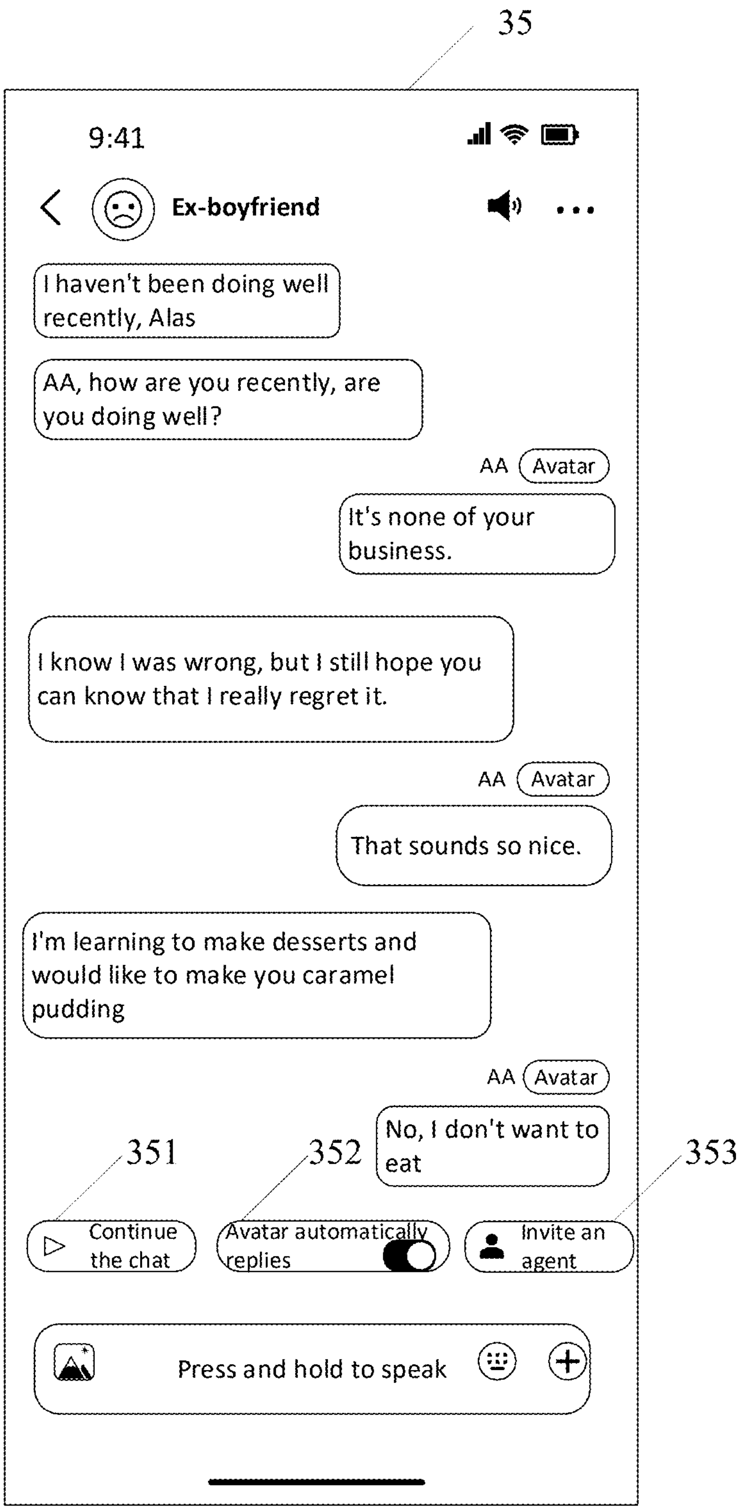
FIG. 3E shows a schematic diagram of a dialogue interface between a dialogue robot and an agent according to some embodiments of the present disclosure.

After the control 3341 is triggered, an interface as shown in FIG. 3E can be displayed. FIG. 3E shows a schematic diagram of a dialogue interface between a dialogue robot and an agent according to some embodiments of the present disclosure. As shown in FIG. 3E, in a dialogue interface 35, the dialogue robot AA can automatically talk to the agent "ex-boyfriend" according to the configured dialogue strategy. When a dialogue ends, the dialogue robot AA can continue to send dialogues through a continue dialogue control 351. Through an automatic reply control 352, it can be controlled whether the dialogue robot automatically replies the content sent from the agent. In this dialogue, other agents can continue to be invited to test the group chat through an invitation control 353.

Returning to FIG. 3C, the dialogue interface 33 may further include a control 334 for setting an image and a control 335 for setting a voice, so as to further set or adjust the basic information of the dialogue robot.

After completing the creation of the dialogue robot, the dialogue strategy of the dialogue robot can be configured through multiple types of configuration interfaces.

In some embodiments, the configuration interface includes a first dialogue interface between the first user and the dialogue robot, and sending a configuration instruction to the dialogue robot through the configuration interface comprises: sending a dialogue, which is sent from the first user, as the configuration instruction to the dialogue robot in the first dialogue interface.

As shown in FIG. 3C, the first user can send "You can use more humorous language when chatting with my friend A" to the dialogue robot AA and so on. The dialogue robot can also record this or respond further. This method can be used as an implicit configuration method, which enables the first user to configure the dialogue robot more flexibly and freely, and its form and language used are not limited. Therefore, the efficiency of dialogue configuration can be improved.

In some embodiments, the configuration interface comprises a form interface comprising at least one of an input control or a selection control, and the sending the configuration instruction to the dialogue robot through the configuration interface includes: obtaining, in response to a submission operation on the form interface, description information and input information of the control on the form interface, wherein the description information comprises at least one of information for guiding input or an example of the dialogue strategy; determining the configuration instruction based on at least one of the description information or the input information; and sending the configuration instruction to the dialogue robot.

For example, the configuration interface can include "Participate in the dialogue when ______", and the underlined part corresponds to an input control (such as a text input box) or a selection control for the user to input or select the dialogue scene. The input control (such as a text input box) or the selection control may display "Please input the dialogue scene" as the description information, and "Participate in the dialogue" can also be used as the description information. In this example, if the content input or selected by the user is "when talking with user X", the generated configuration instruction includes "Participate in the dialogue when talking with user X".

For another example, the configuration interface may include "When talking with user X ______", and the underlined part corresponds to an input control (such as a text input box) or a selection control for the user to input a dialogue strategy. The input control (such as a text input box) or the selection control may display "Please input a dialogue strategy" as the description information, or "when talking with user X" can also be used as the description information. In this example, if the content input or selected by the user is "Use a more serious tone", the generated configuration instruction includes "Use a more serious tone when talking with user X".

In some embodiments, a historical dialogue record can be selected as a reference for the dialogue strategy of the dialogue robot. A historical dialogue record selected by the first user is determined through the configuration interface, wherein the historical dialogue record comprises dialogue(s) between the first user and the second user and is authorized by the first user; and the configuration instruction including the historical dialogue record and a learning instruction are sent to the dialogue robot, wherein the learning instruction is for instructing the dialogue robot to extract a dialogue strategy of the first user in a dialogue scene of the historical dialogue record.

The configuration interface can be a configuration interface realized by any one of the aforementioned embodiments or in other ways. The configuration interface can, for example, provide a selection control for historical dialogue records. Another implementation is that when viewing a historical dialogue record page, the configuration operation can be triggered by selecting a part of the historical dialogue records.

When sending a configuration instruction, the sending can also be triggered through a specified control. For example, after selecting the historical dialogue record, the generation of the configuration instruction is triggered through a confirmation control, which contains a learning instruction by default. Alternatively, in the dialogue interface between the first user and the dialogue robot, the user can first send the selected historical dialogue record to the dialogue robot, and then send the learning instruction through natural language, such as "The next time you encounter a similar situation, you can say it as I did in the above dialogue".

After the dialogue robot obtains the dialogue record, it can carry out semantic analysis on it based on the learning instruction, extract the dialogue strategy from it and perform configuration.

This embodiment does not send a clear dialogue strategy to the dialogue robot, but instructs the dialogue robot to learn the dialogue strategy based on the existing historical dialogue records, thus reducing the complexity of dialogue configuration by users and improving the configuration efficiency of users.

In the process that the first user reviews the application of the dialogue robot, that is, in the process of dialogue between the dialogue robot and other users, feedback can be given based on the dialogue already generated by the dialogue robot, so that the dialogue robot can adjust its dialogue strategy. In some embodiments, a second dialogue interface between the dialogue robot and the second user is displayed; a feedback is received from the first user on a dialogue sent by the dialogue robot in the second dialogue interface, wherein the feedback comprises affirmation, negation or modification; and the dialogue strategy of the dialogue robot is adjusted based on the feedback.

Figure 4:
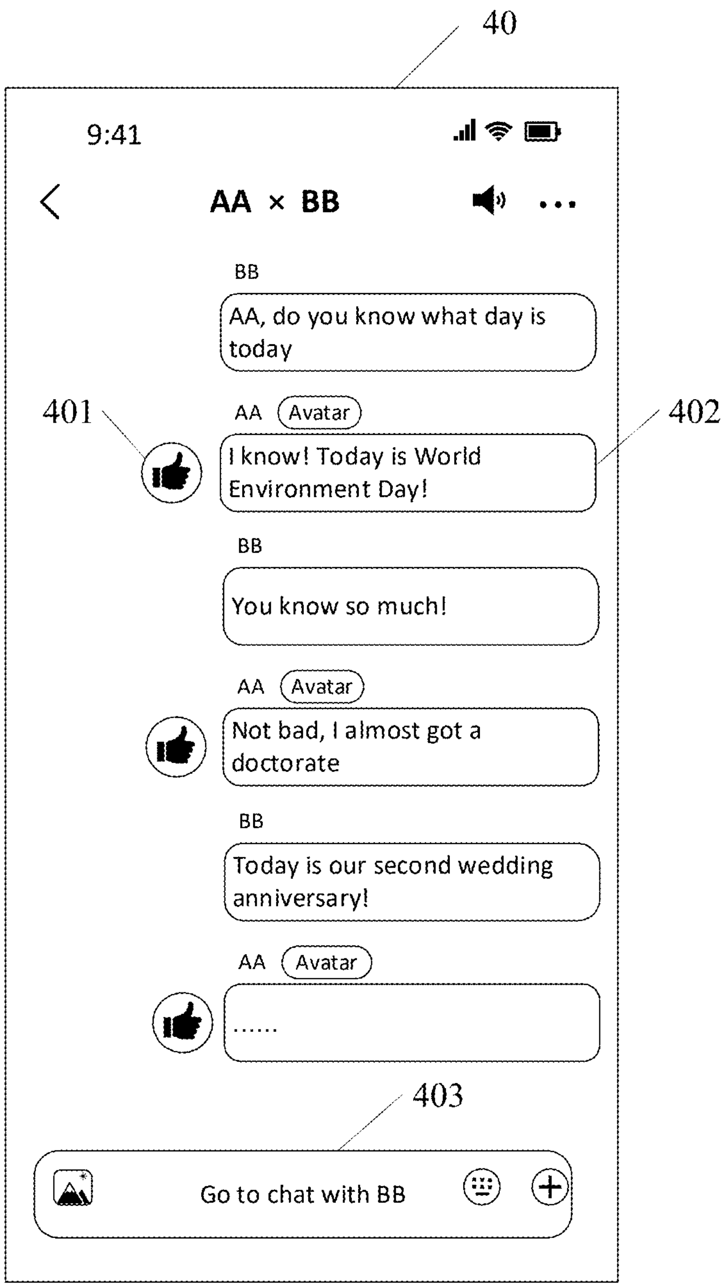
FIG. 4 shows a schematic diagram of a historical dialogue interface according to some embodiments of the present disclosure.

FIG. 4 shows a schematic diagram of a historical dialogue recording interface according to some embodiments of the present disclosure. As shown in FIG. 4, an interface 40 is a historical dialogue recording interface between the dialogue robot AA and a friend BB of the first user. In this interface 40, there are thumbs-up marks 401 on the left of the contents sent from the dialogue robot AA. In response to the first user triggering the thumbs-up mark 401, it means that the first user affirms the dialogue generated by the dialogue robot AA, and further affirms the dialogue strategy for generating the dialogue. The dialogue robot AA can continue to use the dialogue strategy in similar dialogue scenes subsequently. If the first user thinks that a message sent from the dialogue robot AA has shortcomings or completely violates his original intention, the first user can directly modify it in the interface 40. For example, he can trigger the control 402 where the message sent from the dialogue robot AA is located to perform modification, but the modification is not visible to the user BB. In addition, a control (not shown in the figure) for expressing negation can also be set in the interface 40 for the first user to express disapproval of the dialogue strategy behind the message.

After the user configures the dialogue robot based on the above similar interface, a chat control 403 in the interface 40 can also be triggered to trigger the display of the dialogue interface between the first user and the user BB, so that the first user can initiate a dialogue with the second user after adjusting the dialogue strategy of the dialogue robot to practically test the adjustment effect.

The above embodiments exemplarily describe the configuration method of a dialogue robot of the present disclosure. Embodiments of related devices involved in the present disclosure will be introduced below.

Figure 5:
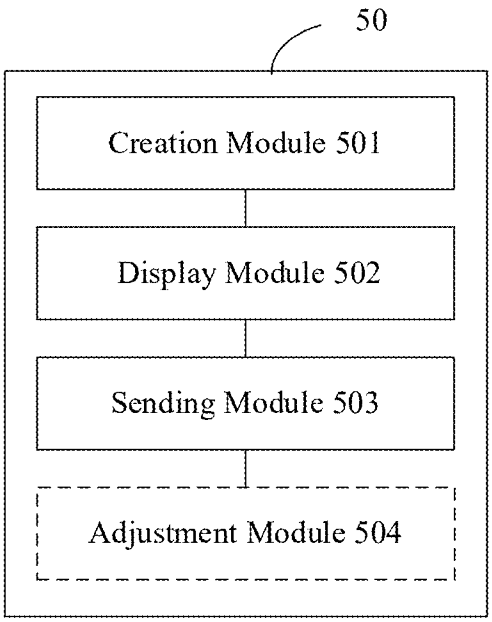
FIG. 5 shows a structural schematic diagram of a configuration apparatus of a dialogue robot according to some embodiments of the present disclosure.

FIG. 5 shows a structural schematic diagram of a configuration apparatus of a dialogue robot according to some embodiments of the present disclosure. As shown in FIG. 5, a configuration apparatus 50 of this embodiment comprises: a creation module 501 configured for creating a dialogue robot for a first user, wherein the dialogue robot is for assisting the first user in a dialogue with a second user; a display module 502 configured for displaying a configuration interface of the dialogue robot of the first user; and a sending module 503 configured for sending a configuration instruction to the dialogue robot through the configuration interface, wherein the configuration instruction comprises a dialogue strategy.

In some embodiments, the configuration instruction comprises a dialogue strategy for a specified dialogue scene; the dialogue scene comprises at least one of a dialogue between the first user and the second user comprising a specified dialogue topic, the second user belonging to a specified category, the second user being a specified user, or a dialogue state of the first user belonging to a specified state; and the dialogue strategy comprises at least one of a strategy of whether the dialogue robot participating in the dialogue between the first user and the second user or a language style of the dialogue robot.

In some embodiments, a first dialogue scene comprises at least one of the dialogue between the first user and the second user comprising the specified dialogue topic, the second user belonging to the specified category, the second user being the specified user, or the dialogue state of the first user belonging to the specified state, and the dialogue strategy for the specified dialogue scene comprises: participating in the dialogue between the first user and the second user in response to detecting the first dialogue scene.

In some embodiments, a second dialogue scene comprises at least one of the second user belonging to the specified category or the second user being the specified user, and the dialogue strategy for the specified dialogue scene comprises: determining, in response to detecting the second dialogue scene, a language style based on an identification or a category of the second user having the dialogue with the first user, and participating in the dialogue between the first user and the second user based on the language style.

In some embodiments, a third dialogue scene comprises a topic of the dialogue belonging to a specified category, and the dialogue strategy for the specified dialogue scene comprises: determining, in response to detecting the third dialogue scene, a language style based on the topic of the dialogue between the first user and the second user, and participating in the dialogue based on the language style.

In some embodiments, the configuration interface comprises a first dialogue interface of the first user and the dialogue robot, and the sending module 503 is further configured for sending a dialogue, which is sent from the first user, as the configuration instruction to the dialogue robot in the first dialogue interface.

In some embodiments, the configuration interface comprises a form interface comprising at least one of an input control or a selection control, and the sending module 503 is further configured for: obtaining, in response to a submission operation on the form interface, description information and input information of the control on the form interface, wherein the description information comprises at least one of information for guiding input or an example of the dialogue strategy; determining the configuration instruction based on at least one of the description information or the input information; and sending the configuration instruction to the dialogue robot.

In some embodiments, the sending module 503 is further configured for: determining a historical dialogue record selected by the first user through the configuration interface, wherein the historical dialogue record comprises dialogue(s) between the first user and the second user and is authorized by the first user; and sending the configuration instruction comprising the historical dialogue record and a learning instruction to the dialogue robot, wherein the learning instruction is for instructing the dialogue robot to extract a dialogue strategy of the first user in a dialogue scene of the historical dialogue record.

In some embodiments, the creation module 501 is further configured for: generating an image of the dialogue robot based on style description information input by the first user and an image from the first user authorized by the first user; and creating the dialogue robot for the first user based on the image of the dialogue robot.

In some embodiments, the creation module 501 is further configured for: generating voice information of the dialogue robot based on voice of the first user authorized by the first user; and creating the dialogue robot for the first user based on the voice information of the dialogue robot.

In some embodiments, the configuration apparatus 50 further comprises an adjustment module 504 configured for: displaying a second dialogue interface between the dialogue robot and the second user; receiving a feedback from the first user on a dialogue sent by the dialogue robot in the second dialogue interface, wherein the feedback comprises affirmation, negation or modification; and adjusting the dialogue strategy of the dialogue robot based on the feedback.

In some embodiments, assisting the first user to have a dialogue with other users comprises: taking a place of the first user to have a dialogue with the second user; or participating in the dialogue between the first user and the second user.

It should be noted that the above-mentioned units are only logical modules divided according to the specific functions they implement, and are not used to limit the specific implementation ways, for example, the functions can be realized in software, hardware or a combination of software and hardware. In actual implementation, the above units can be realized as independent physical entities, or can also be realized by a single entity (for example, a processor (CPU or DSP, etc.), an integrated circuit, etc.). In addition, the above-mentioned units are shown by dotted lines in the drawings, indicating that these units may not actually exist, and the operations/functions they realize may be realized by the processing circuit itself.

In addition, although not shown, the device may also include a memory, which may store various information generated by the device and various units included in the device during operation, programs and data used for operation, data to be transmitted by the communication unit, and the like. The memory may be a volatile memory and/or a nonvolatile memory. For example, the memory may include, but is not limited to, a random access memory (RAM), a dynamic random access memory (DRAM), a static random access memory (SRAM), a read-only memory (ROM), and a flash memory. Of course, the memory may also be located outside the device. Alternatively, although not shown, the device may also include a communication unit, which may be used to communicate with other devices. In an example, the communication unit can be implemented in an appropriate manner known in the art, including, for example, communication components such as antenna arrays and/or radio frequency links, various types of interfaces, communication units, and the like, which will not be described in detail here. In addition, the device may also include other components not shown, such as a radio frequency link, a baseband processing unit, a network interface, a processor, a controller, etc., which will not be described in detail here.

Figure 6:
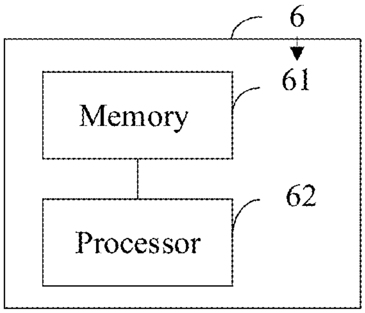
FIG. 6 shows a structural schematic diagram of an electronic device according to some embodiments of the present disclosure.

Some embodiments of the present disclosure also provide an electronic device. FIG. 6 shows a structural schematic diagram of an electronic device according to some embodiments of the present disclosure. For example, in some embodiments, an electronic device 6 may be a device of any type, including, for example, but not limited to, a mobile terminal such as a mobile phone, a notebook computer, a digital broadcast receiver, a PDA (personal digital assistant), a PAD (tablet), a PMP (portable multimedia player), a vehicle terminal (e.g., a car navigation terminal), and etc., or a fixed terminal such as a digital TV, a desktop computer, and etc. For example, the electronic device 6 may include a display panel for displaying data and/or execution results utilized in the solution according to the present disclosure. For example, the display panel can be in various shapes, such as a rectangular panel, an oval panel or a polygonal panel. In addition, the display panel can be not only a flat panel, but also a curved panel or even a spherical panel.

As shown in FIG. 6, the electronic device 6 of this embodiment includes a memory 61 and a processor 62 coupled to the memory 61. It should be noted that the components of the electronic device 6 shown in FIG. 6 are only exemplary, not limiting, and the electronic device 6 may have other components according to the actual application requirements. The processor 62 may control other components in the electronic device 6 to execute desired functions.

In some embodiments, the memory 61 is used to store one or more computer-readable instructions. When the processor 62 is used to run the computer-readable instructions, the computer-readable instructions, when run by the processor 62, implement the method according to any of the above embodiments. For the specific implementation of each step of the method and related explanations, please refer to the above-mentioned embodiments, and the repetition is omitted here.

For example, the processor 62 and the memory 61 can communicate with each other directly or indirectly. For example, the processor 62 and the memory 61 may communicate with each other through a network. The network may include a wireless network, a wired network, and/or any combination of the wireless network and the wired network. The processor 62 and the memory 61 can also communicate with each other through the system bus, and the present disclosure does not limit this.

For example, the processor 62 can be embodied as various appropriate processors, processing devices, etc., such as a central processing unit (CPU), a graphics processing unit (GPU), a network processor (NP), etc. It can also be a digital signal processor (DSP), an application specific integrated circuit (ASIC), a field programmable gate array (FPGA) or other programmable logic devices, discrete gates or transistor logic devices, and discrete hardware components. The central processing unit (CPU) can be X86 or ARM architecture. For example, the memory 61 may include any combination of various forms of computer-readable storage media, such as volatile memory and/or nonvolatile memory. The memory 61 may include, for example, a system memory that stores, for example, an operating system, an application program, a Boot Loader, a database, and other programs, etc. Various applications and data can also be stored in the storage medium.

Figure 7:
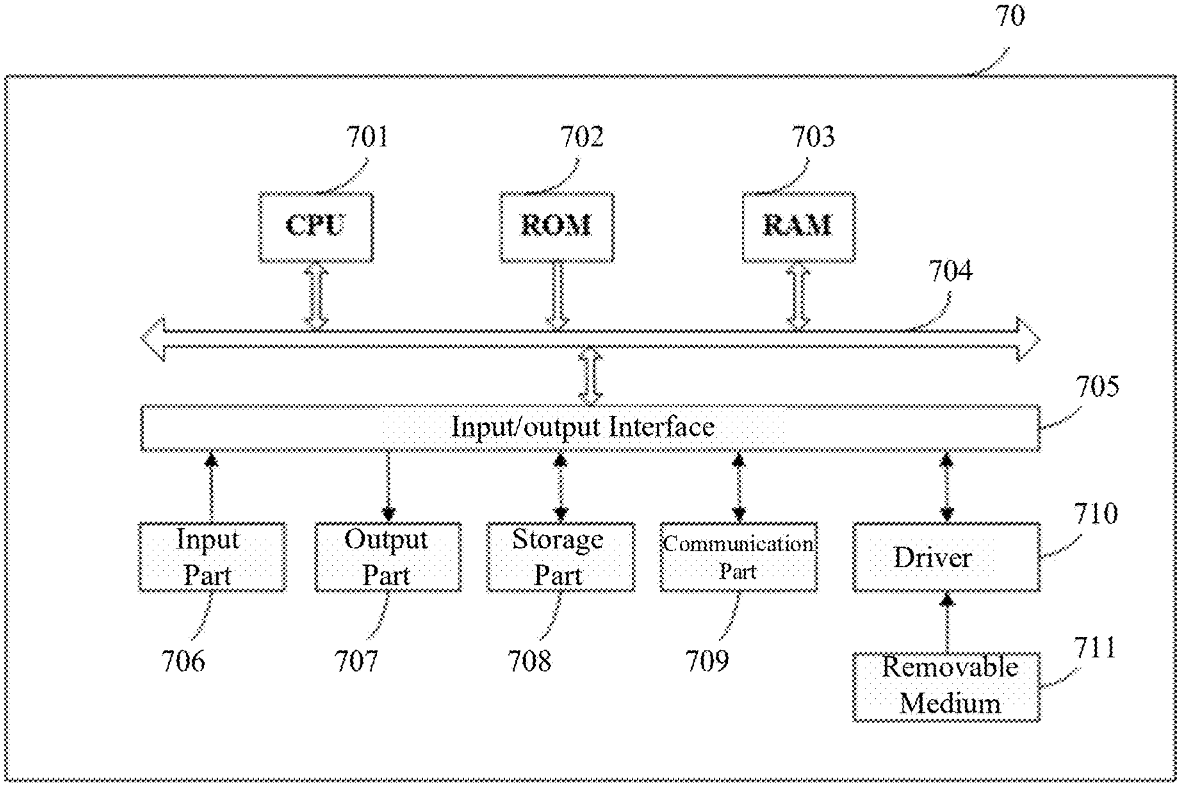
FIG. 7 shows a structural schematic diagram of a computer system according to some embodiments of the present disclosure.

In addition, according to some embodiments of the present disclosure, when various operations/processes according to the present disclosure are realized by software and/or firmware, programs constituting the software can be installed from a storage medium or a network to a computer system with a dedicated hardware structure, such as a computer system 70 shown in FIG. 7. The computer system, when installed with various programs, can perform various functions, including the functions described above. FIG. 7 shows a structural schematic diagram of a computer system according to some embodiments of the present disclosure.

In FIG. 7, a central processing unit (CPU) 701 performs various processes according to a program stored in a read-only memory (ROM) 702 or a program loaded from a storage part 708 into a random access memory (RAM) 703. In the RAM 703, data required when the CPU 701 executes various processes and the like are also stored as needed. The central processing unit is only exemplary, and it can also be other types of processors, such as the various processors mentioned above. ROM 702, RAM 703 and storage part 708 may be various forms of computer-readable storage media, as described below. It should be noted that although the ROM 702, the RAM 703 and the storage device 708 are shown in FIG. 7 respectively, one or more of them may be merged or located in the same or different memories or storage modules.

The CPU 701, the ROM 702 and the RAM 703 are connected to each other via a bus 704. An input/output interface 705 is also connected to the bus 704.

The following components are connected to the input/output interface 705: an input part 706 such as a touch screen, a touch pad, a keyboard, a mouse, an image sensor, a microphone, an accelerometer, a gyroscope, etc.; an output part 707 including a display such as a cathode ray tube (CRT), a liquid crystal display (LCD), a speaker, a vibrator, etc.; a storage part 708 including a hard disk, a magnetic tape, etc.; and a communication part 709 including a network interface card such as a LAN card, a modem, and the like. The communication part 709 allows communication processing to be performed via a network such as the Internet. It is easy to understand that although FIG. 7 shows that various devices or modules in the computer system 70 communicate through the bus 704, they may also communicate through a network or other means, wherein the network may include a wireless network, a wired network, and/or any combination of the wireless network and the wired network.

A driver 710 is also connected to the input/output interface 705 as needed. A removable medium 711, such as a magnetic disk, an optical disk, a magneto-optical disk, a semiconductor memory, etc., is mounted on the drive 710 as needed, so that a computer program read from it is installed in the storage part 708 as needed.

In the case where the above-mentioned series of processes are realized by software, the programs constituting the software may be installed from a network such as the Internet or a storage medium such as the removable medium 711.

The processes described above with reference to the flow diagrams may be implemented as computer software programs, according to the embodiment of the present disclosure. For example, an embodiment of the present disclosure includes a computer program product comprising a computer program carried on a computer readable medium, the computer program containing program code for performing the method illustrated by the flow diagram. In such an embodiment, the computer program may be downloaded and installed from the network via the communication device 709, or installed from the storage device 708, or installed from the ROM 702. When executed by the CPU 701, the computer program executes the above-described functions defined in the method of the embodiments of the present disclosure.

It should be noted that in the context of the present disclosure, a computer readable medium may be a tangible medium that can contain, or store a program for use by or in combination with an instruction execution system, apparatus, or device. The computer readable medium may be a computer readable signal medium or a computer readable storage medium or any combination of the two. The computer readable storage medium may be, for example, but not limited to, an electronic, magnetic, optical, electromagnetic, infrared, or semiconductor system, apparatus, or device, or any combination of the foregoing. More specific examples of the computer readable storage medium may include, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, a computer readable storage medium may be any tangible medium that contains, or stores a program for use by or in combination with an instruction execution system, apparatus, or device. In contrast, in the present disclosure, a computer readable signal medium may include a data signal propagated in a baseband or as a part of a carrier wave, wherein a computer readable program code is carried therein. Such a propagated data signal may take a variety of forms, including, but not limited to, an electro-magnetic signal, an optical signal, or any suitable combination thereof. A computer-readable signal medium may be any computer readable medium other than a computer-readable storage medium and the computer-readable signal medium can communicate, propagate, or transport a program for use by or in combination with an instruction execution system, apparatus, or device. Program code embodied on a computer-readable medium may be transmitted using any appropriate medium, including but not limited to: electrical wires, optical cables, RF (radio frequency), etc., or any suitable combination thereof.

The computer readable medium may be included in the above-mentioned electronic device; or it may exist alone without being assembled into the electronic device.

In some embodiments, a computer program is also provided, comprising instructions which, when executed by a processor, cause the processor to perform the method of any one of the above embodiments. For example, the instructions may be embodied as computer program codes.

In an embodiment of the present disclosure, computer program code for carrying out operations of the present disclosure may be written in one or more programming languages or a combination thereof, the programming languages include, but are not limited to an object oriented programming language such as Java, Smalltalk, C++, and also include conventional procedural programming languages, such as the "C" programming language, or similar programming languages. The program code can be executed entirely on the user's computer, partly on the user's computer, as an independent software package, partly on the user's computer and partly executed on a remote computer, or entirely on the remote computer or server. In the scenario involving a remote computer, the remote computer may be connected to the user's computer through any type of network, including a Local Area Network (LAN) or a Wide Area Network (WAN), or may be connected to an external computer (for example, through the Internet using an Internet service provider).

The flow diagrams and block diagrams in the figures illustrate the architecture, functionality, and operation that are possibly implemented by systems, methods and computer program products according to various embodiments of the present disclosure. In this regard, each block in the flow diagrams or block diagrams may represent a module, program segment, or portion of code, which comprises one or more executable instructions for implementing the specified logical function(s). It should also be noted that, in some alternative implementations, the functions noted in the blocks may occur in an order different from that noted in the figures. For example, two blocks shown in succession may, in fact, be executed substantially concurrently, or they may sometimes be executed in a reverse order, depending upon the function involved. It will also be noted that each block of the block diagrams and/or flow diagrams, and a combination of blocks in the block diagrams and/or flow diagrams, can be implemented by special purpose hardware-based systems that perform the specified functions or operations, or combinations of special purpose hardware and computer instructions.

The modules, components or units described in the embodiments of the present disclosure may be implemented by software or hardware. Wherein the name of the module, component or unit does not constitute the limitation of the module, component or unit itself in some cases.

The functions described above herein may be performed, at least in part by one or more hardware logic components. For example, without limitation, exemplary types of hardware logic components that may be used include Field Programmable Gate Arrays (FPGAs), Application Specific Integrated Circuits (ASICs), Application Specific Standard Products (ASSPs), Systems on a Chip (SOCs), Complex Programmable Logic Devices (CPLDs), and so forth.

The above descriptions are only some embodiments of the present disclosure and are illustrative of the principles of the technology employed. It will be appreciated by those skilled in the art that the scope of disclosure of the present disclosure is not limited to the technical solutions formed by specific combinations of the above-described technical features, and should also encompass other technical solutions formed by any combination of the above-described technical features or equivalents thereof without departing from the concept of the present disclosure. For example, the technical solutions formed by the above features be replaced with (but not limited to) features having similar functions disclosed in the present disclosure.

In the description provided herein, numerous specific details are set forth. However, it can be understood that embodiments of the present invention may be practiced without these specific details. In other instances, well-known methods, structures and techniques are not shown in detail in order not to obscure the understanding of this description.

Further, although operations are depicted in a particular order, this should not be understood as requiring such operations to be performed in the particular order shown or in sequential order. Under certain circumstances, multitasking and parallel processing may be advantageous. Likewise, although several specific implementation details are included in the above discussion, these should not be construed as limitations on the scope of the present disclosure. Certain features that are described in the context of a single embodiment can also be implemented in combination in the single embodiment. Conversely, various features that are described in the context of a single embodiment can also be implemented in multiple embodiments separately or in any suitable subcombination.

Although some specific embodiments of the present disclosure have been exemplified in detail, it shall be understood by those skilled in the art that the above examples are only illustrative, but shall by no means limit the scope of the present disclosure. Those skilled in the art will appreciate that the above embodiments may be modified without departing from the scope and spirit of the present disclosure. The scope of the present disclosure is defined by the appended claims.

What is claimed is:

1. A configuration method of a dialogue robot, comprising:

creating a dialogue robot for a first user, wherein the dialogue robot is for assisting the first user in a dialogue with a second user;

displaying a configuration interface of the dialogue robot of the first user; and sending a configuration instruction to the dialogue robot through the configuration interface, wherein the configuration instruction comprises a dialogue strategy for a specified dialogue scene, the specified dialogue scene comprises a second dialogue scene and a third dialogue scene, the second dialogue scene comprises at least one of the second user belonging to a specified category or the second user being a specified user, and the third dialogue scene comprises a topic of the dialogue belonging to the specified category, wherein the dialogue strategy for the second dialogue scene comprises:

participating, in response to the second dialogue scene, in the dialogue between the first user and the second user, and sending messages to the second user using the language style, wherein the language style is determined based on an identification or a category of the second user, the second user having the dialogue with the first user, the dialogue strategy for the third dialogue scene comprises:

participating, in response to the third dialogue scene, in the dialogue based on a language style, wherein the language style is based on the topic of the dialogue between the first user and the second user, the configuration interface comprises at least one of an input control or a selection control, the input control or the selection control comprising a dialogue scene, and the sending the configuration instruction to the dialogue robot through the configuration interface comprises:

obtaining, in response to a submission operation on the configuration interface, description information and input information of the control on the configuration interface, wherein the description information comprises at least one of information for guiding input or an example of the dialogue strategy;

determining the configuration instruction based on at least one of the description information or the input information; and sending the configuration instruction to the dialogue robot.

2. The configuration method according to claim 1, wherein the dialogue scene further comprises at least one of a dialogue between the first user and the second user comprising a specified dialogue topic or a dialogue state of the first user belonging to a specified state, and the dialogue strategy comprises at least one of a strategy of whether the dialogue robot participating in the dialogue between the first user and the second user or a language style of the dialogue robot.

3. The configuration method according to claim 2, wherein a first dialogue scene comprises at least one of the dialogue between the first user and the second user comprising the specified dialogue topic, the second user belonging to the specified category, the second user being the specified user, or the dialogue state of the first user belonging to the specified state, and the dialogue strategy for the specified dialogue scene comprises:

participating in the dialogue between the first user and the second user in response to detecting the first dialogue scene.

4. The configuration method according to claim 1, wherein the configuration interface comprises a first dialogue interface of the first user and the dialogue robot, and the sending the configuration instruction to the dialogue robot through the configuration interface comprises:

sending a dialogue, which is sent from the first user, as the configuration instruction to the dialogue robot in the first dialogue interface.

5. The configuration method according to claim 1, wherein the configuration interface comprises a form interface comprising the at least one of the input control or the selection control.

6. The configuration method according to claim 1, wherein the sending the configuration instruction to the dialogue robot through the configuration interface comprises:

determining a historical dialogue record selected by the first user through the configuration interface, wherein the historical dialogue record comprises dialogue(s) between the first user and the second user and is authorized by the first user; and sending the configuration instruction comprising the historical dialogue record and a learning instruction to the dialogue robot, wherein the learning instruction is for instructing the dialogue robot to extract a dialogue strategy of the first user in a dialogue scene of the historical dialogue record.

7. The configuration method according to claim 1, wherein the creating the dialogue robot for the first user comprises:

generating an image of the dialogue robot based on style description information input by the first user and an image from the first user authorized by the first user; and creating the dialogue robot for the first user based on the image of the dialogue robot.

8. The configuration method according to claim 1, wherein the creating the dialogue robot for the first user comprises:

generating voice information of the dialogue robot based on voice of the first user authorized by the first user; and creating the dialogue robot for the first user based on the voice information of the dialogue robot.

9. The configuration method according to claim 1, further comprising:

displaying a second dialogue interface between the dialogue robot and the second user;

receiving a feedback from the first user on a dialogue sent by the dialogue robot in the second dialogue interface, wherein the feedback comprises affirmation, negation or modification; and adjusting the dialogue strategy of the dialogue robot based on the feedback.

10. The configuration method according to claim 1, wherein the assisting the first user in the dialogue with the second user comprises:

taking a place of the first user to have a dialogue with the second user; or participating in the dialogue between the first user and the second user.

11. An electronic device comprising:

a memory; and a processor coupled to the memory, the processor being configured to, based on instructions stored in the memory, perform a configuration method comprising:

creating a dialogue robot for a first user, wherein the dialogue robot is for assisting the first user in a dialogue with a second user;

displaying a configuration interface of the dialogue robot of the first user; and sending a configuration instruction to the dialogue robot through the configuration interface, wherein the configuration instruction comprises a dialogue strategy for a specified dialogue scene, the specified dialogue scene comprises a second dialogue scene and a third dialogue scene, the second dialogue scene comprises at least one of the second user belonging to a specified category or the second user being a specified user, and the third dialogue scene comprises a topic of the dialogue belonging to the specified category, wherein the dialogue strategy for the second dialogue scene comprises:

participating, in response to the second dialogue scene, in the dialogue between the first user and the second user and sending messages to the second user using the language style, wherein the language style is determined based on an identification or a category of the second user, the second user having the dialogue with the first user, the dialogue strategy for the third dialogue scene comprises:

participating, in response to the third dialogue scene, in the dialogue based on a language style, wherein the language style is based on the topic of the dialogue between the first user and the second user, the configuration interface comprises at least one of an input control or a selection control, the input control or the selection control comprising a dialogue scene, and the sending the configuration instruction to the dialogue robot through the configuration interface comprises:

obtaining, in response to a submission operation on the configuration interface, description information and input information of the control on the configuration interface, wherein the description information comprises at least one of information for guiding input or an example of the dialogue strategy;

determining the configuration instruction based on at least one of the description information or the input information; and sending the configuration instruction to the dialogue robot.

12. The electronic device according to claim 11, wherein:

the dialogue scene further comprises at least one of a dialogue between the first user and the second user comprising a specified dialogue topic or a dialogue state of the first user belonging to a specified state; and the dialogue strategy comprises at least one of a strategy of whether the dialogue robot participating in the dialogue between the first user and the second user or a language style of the dialogue robot.

13. The electronic device according to claim 12, wherein a first dialogue scene comprises at least one of the dialogue between the first user and the second user comprising the specified dialogue topic, the second user belonging to the specified category, the second user being the specified user, or the dialogue state of the first user belonging to the specified state, and the dialogue strategy for the specified dialogue scene comprises:

participating in the dialogue between the first user and the second user in response to detecting the first dialogue scene.

14. The electronic device according to claim 11, wherein the configuration interface comprises a first dialogue interface of the first user and the dialogue robot, and the sending the configuration instruction to the dialogue robot through the configuration interface comprises:

sending a dialogue, which is sent from the first user, as the configuration instruction to the dialogue robot in the first dialogue interface.

15. The electronic device according to claim 11, wherein the configuration interface comprises a form interface comprising the at least one of the input control or the selection control.

16. A non-transitory computer-readable storage medium having stored thereon a computer program which, when executed by a processor, implements a configuration method of a dialogue robot:

creating the dialogue robot for a first user, wherein the dialogue robot is for assisting the first user in a dialogue with a second user;

displaying a configuration interface of the dialogue robot of the first user; and sending a configuration instruction to the dialogue robot through the configuration interface, wherein the configuration instruction comprises a dialogue strategy for a specified dialogue scene, the specified dialogue scene comprises a second dialogue scene and a third dialogue scene, the second dialogue scene comprises at least one of the second user belonging to a specified category or the second user being a specified user, and the third dialogue scene comprises a topic of the dialogue belonging to the specified category, wherein the dialogue strategy for the second dialogue scene comprises:

participating, in response to the second dialogue scene, in the dialogue between the first user and the second user and sending messages to the second user using the language style, wherein the language style is determined based on an identification or a category of the second user, the second user having the dialogue with the first user, the dialogue strategy for the third dialogue scene comprises:

participating, in response to the third dialogue scene, in the dialogue based on a language style, wherein the language style is based on the topic of the dialogue between the first user and the second user, the configuration interface comprises at least one of an input control or a selection control, the input control or the selection control comprising a dialogue scene, and the sending the configuration instruction to the dialogue robot through the configuration interface comprises:

obtaining, in response to a submission operation on the configuration interface, description information and input information of the control on the configuration interface, wherein the description information comprises at least one of information for guiding input or an example of the dialogue strategy;

determining the configuration instruction based on at least one of the description information or the input information; and sending the configuration instruction to the dialogue robot.

* * * * *